(12) United States Patent
Creigh et al.

(10) Patent No.: US 6,429,817 B1
(45) Date of Patent: Aug. 6, 2002

(54) RETRACTABLE ANTENNA FOR PORTABLE TELEPHONE

(75) Inventors: George S. Creigh, Acworth; Michelle D. Liviccori, Atlanta, both of GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/678,526

(22) Filed: Oct. 3, 2000

(51) Int. Cl.[7] .................................................. H01Q 1/24
(52) U.S. Cl. ........................................ 343/702; 343/882
(58) Field of Search ................................ 343/702, 882, 343/889, 903; 455/89, 90; 74/20, 436, 431; H01Q 1/24

(56) References Cited

U.S. PATENT DOCUMENTS

| | | | |
|---|---|---|---|
| 5,166,695 A | 11/1992 | Chan et al. ................. 343/702 |
| 5,448,251 A | * 9/1995 | Gerszberg et al. .......... 343/702 |
| 5,493,690 A | 2/1996 | Shimazaki .................... 379/63 |
| 5,497,506 A | 3/1996 | Takeyasu ..................... 455/89 |
| 5,542,106 A | 7/1996 | Krenz et al. .................. 455/90 |
| 5,574,772 A | 11/1996 | Scalisi et al. ................. 379/58 |
| 5,576,719 A | 11/1996 | Gerszberg et al. .......... 343/702 |
| 5,635,943 A | 6/1997 | Grunwell ..................... 343/702 |
| 5,668,867 A | * 9/1997 | Nagai .......................... 379/433 |
| 5,714,958 A | 2/1998 | Rudisill ....................... 343/702 |
| 5,748,150 A | 5/1998 | Rudisill ....................... 343/702 |
| 5,831,579 A | 11/1998 | Rudisill ....................... 343/702 |
| 5,859,622 A | 1/1999 | Phillips ........................ 343/903 |
| 5,991,637 A | 11/1999 | Mack, II et al. ............. 455/550 |
| 5,995,809 A | * 11/1999 | Kobayashi ..................... 455/90 |
| 6,052,579 A | 4/2000 | McC Estabrook .......... 455/418 |
| 6,073,027 A | 6/2000 | Norman et al. ............. 455/550 |

FOREIGN PATENT DOCUMENTS

GB 2235850 3/1991

* cited by examiner

Primary Examiner—Don Wong
Assistant Examiner—Trinh Do Dinh
(74) Attorney, Agent, or Firm—Kirkpatrick & Lockhart LLP

(57) ABSTRACT

An antenna system that may be used in a portable radio-telephone. In one embodiment, an antenna is housed within a first housing portion and is extended therefrom when a second portion of the housing is pivoted to an open position relative to the first housing portion. The antenna is retracted back into the first housing portion when the second housing portion is pivoted to a closed position relative to the first housing portion. In another embodiment, the second housing portion is slidably affixed to the first housing portion and the antenna is extended from the first housing portion when the second housing portion is moved relative to an open position relative to the first housing portion and the antenna is retracted into the first housing portion when the second housing portion is moved into a closed position relative to the first housing portion.

7 Claims, 5 Drawing Sheets

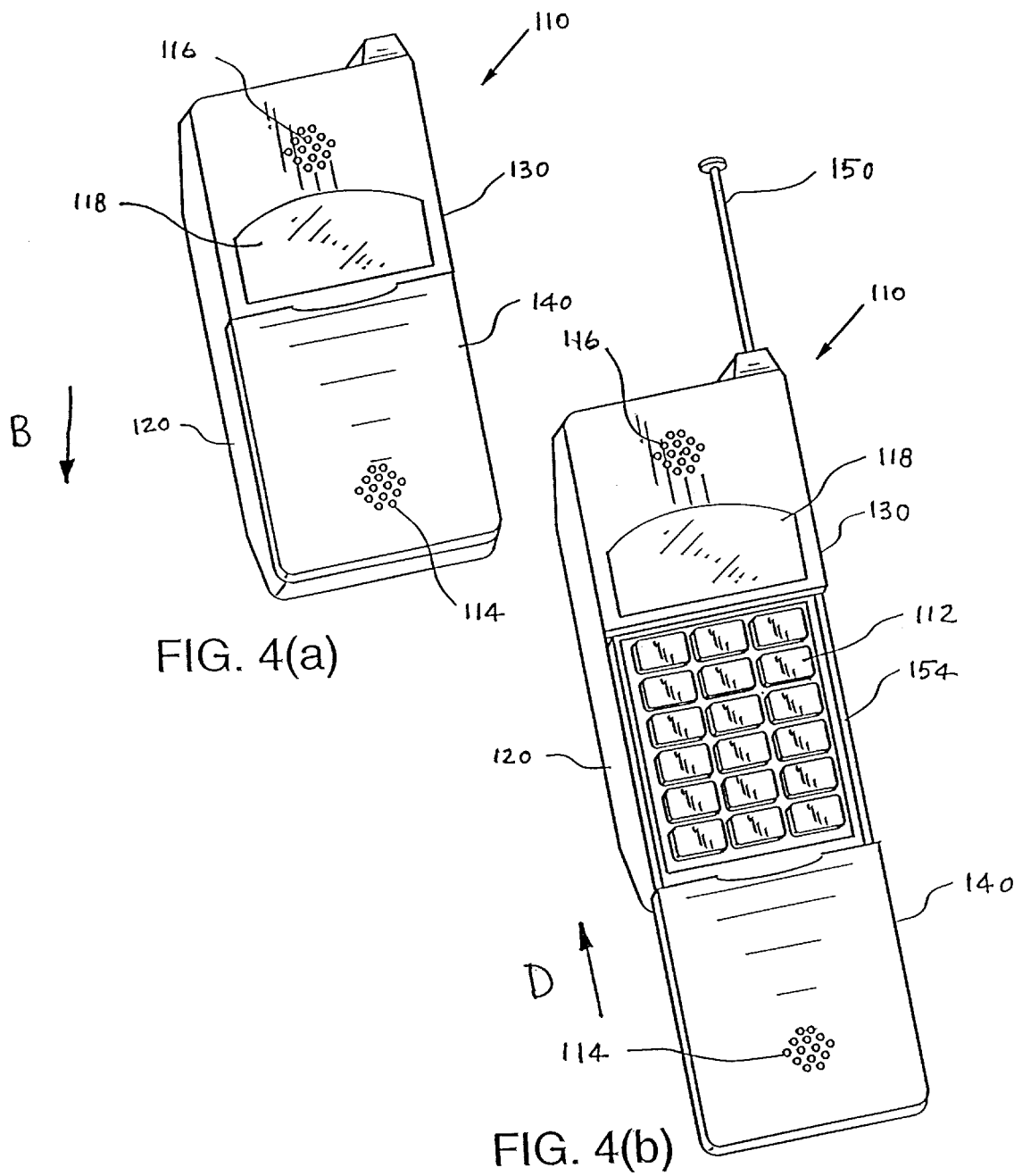

RETRACTABLE ANTENNA FOR PORTABLE TELEPHONE

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to antennas, and more particularly, to portable telephone antennas that can be extended and retracted in response to manipulation of portions of the telephone.

2. Description of the Invention Background

Ever since Alexander Graham Bell uttered those famous words to his assistant, "Mr. Watson come here. I want you," communication has not been the same. Indeed, Mr. Bell would likely marvel at the advancements that have been made over the years since his invention of the telephone. In recent years, portable telephones have become widely used means of communications, particularly between parties who may be away from their home or office. Such telephones are commonly equipped with an antenna for receiving and transmitting communications via radio signals.

Earlier portable telephone designs typically comprised a hand held unit that included a microphone/transmitter, a keypad, a speaker and a liquid crystal display unit. Such units also included a retractable antenna that was slidably retractable into the unit when not in use. Such earlier units tended to be somewhat bulky and cumbersome to carry. Thus, lighter and more compact units were eventually developed. One such design is commonly referred to as a "flip-open" style telephone wherein the telephone comprises two portions that are pivotally interconnected. When not in use, the microphone or "mouthpiece" portion is pivoted to a closed position wherein it essentially covers and protects the keypad portion to which it is pivotally attached. To expose the mouthpiece and keypad so as to make or receive a call, the mouthpiece is pivoted to a position away from the keypad, thus exposing both portions for use. U.S. Pat. No. 5,542,106 to Krenz et al discloses an example of a flip-open style telephone.

Another compact portable telephone design is known as the "slide" style telephone. In this design, one portion of the telephone body slides, rather than rotates, away from the second body portion to expose the keypad. An example of this design is disclosed in United Kingdom Patent Application No. 2,223,850, filed Aug. 22, 1989.

Such portable telephones may utilize a variety of antenna designs. Many portable telephones employ an antenna that must be manually extended and retracted by the user. An example of this type of antenna is disclosed in U.S. Pat. No. 5,493,690 to Shimazaki. Such manually operated antennas have many disadvantages. For example, because the extension and retraction forces are applied manually, the antenna is susceptible to inadvertent damage from excessive force or twisting forces applied to the antenna. Furthermore, it is not uncommon for the user to forget to retract the antenna after use, which can further lead to antenna damage. Finally, when a manual antenna is utilized, there is nothing to prevent the user from using the telephone with the antenna in a retracted or partially retracted position, thereby impairing the performance of the telephone.

To solve some of the problems associated with extended antennas, some portable telephones employ an internal antenna. These antennas provide an attractive appearance and result in a compact telephone that is easy to store. Examples of such antennas are set forth in U.S. Pat. No. 5,574,772 to Scalisi et al. and U.S. Pat. No. 5,542,106 to Krenz et al. While such internal antennas solve the above-mentioned problems commonly associated with manually extendable and retractable antennas, the quality of the transmissions can suffer.

Consequently, portable telephones with antennas that extend and retract automatically have been proposed. For example, U.S. Pat. No. 5,497,506 to Takeyasu discloses an antenna moving mechanism that extends the antenna out of the telephone housing when the telephone is placed in the operational mode and retracts the antenna back into the housing when the telephone is placed in "standby" mode. However, in this design, a motor controls movement of the antenna. This mechanism necessarily causes a significant power drain on the telephone and adds to the expense of the unit.

In an effort to solve the problems associated with motor controlled antennas, other antennas have been designed which are controlled by purely mechanical means. For example, U.S. Pat. No. 5,576,719 to Gerszberg et al. discloses a mechanism for automatically extending and retracting a radio telephone antenna in a "flip-open" type portable telephone. The device is purely mechanical. In this design, an antenna channel and an attachment point are configured so that the act of opening the telephone mouthpiece causes a wire to be pushed into the lower end of the channel. The upper end of the wire is coupled to the lower end of a rod-type antenna plunger. Thus, when the mouthpiece is opened, the upward push imparted to the wire results in extending the antenna plunger from the channel. When the telephone is flipped closed, the downward pull exerted on the wire by closing the mouthpiece retracts the plunger into the channel. This design, however, is limited to use on "flip-open" style portable telephones only.

U.S. Pat. No. 5,166,695 to Chan et al. also discloses an antenna that extends and retracts automatically wherein the movement of the antenna is controlled by purely mechanical means. In this design there are two toothed wheels intermeshed together. The first wheel is secured to the "flip" portion of a "flip-type" portable telephone. As the bottom portion of the phone is opened, the first wheel rotates, thereby causing the second wheel to rotate. Rotation of the second wheel causes the antenna to rotate along screw paths into an extended position. When the phone is closed, the antenna rotates in the opposition direction into the retracted position. However, this design is also limited to use with a "flip-open" style phone. Also, the design requires the use of a multitude of small parts, thereby increasing the likelihood of failure due to breakage of any one of the small components.

Thus, there is a need for a portable telephone antenna that automatically extends when the user is about to receive or make a call and automatically retracts when the call is completed.

There is a further need for an automatically extending and retracting antenna that does not require electrical power for operation.

A need exists for automatically extending and retracting antenna designs that can be incorporated into "flip-open" and "slide" style portable telephones.

Yet another need exists for an automatically extending and retracting antenna design that is resistant to wear or breakage and requires minimal operating parts.

SUMMARY OF THE INVENTION

In accordance with one form of the present invention, there is provided an antenna system that utilizes mechanically actuated apparatus for automatically extending and retracting the antenna. The novel antenna system is particularly advantageous for use in both the "flip-type" and "slide" style portable radiotelephones. In one embodiment of the invention, the system comprises a first elongated slide track affixed to an antenna. The first slide track has means disposed thereon for engaging a wheel that is affixed to at least a portion of the first slide track. Interlocking means are provided on the wheel that cooperate with engaging means provided on the first slide track. Means are also provided to rotate the wheel. When the wheel is rotated, a linear movement is imparted to the slide track. Since the antenna is affixed to the slide track, the antenna is moved linearly. Thus, depending on the direction in which the wheel is rotated, the antenna is automatically extended or retracted.

Various means may be utilized to rotate the wheel. In one embodiment, an elongated guide rod is provided, wherein the wheel is disposed at an end of the guide rod. This design is particularly useful in a "flip-type" radiotelephone. In this type of telephone, the guide rod is disposed between a first portion and a second portion of the body or housing of the telephone, is attached to the second portion and pivotally connects the first portion to the second portion. Thus, when the second portion of the body is rotated away from the first portion, the guide rod is rotated. Rotation of the guide rod turns the wheel, thus imparting a linear movement to the first slide track. When the second portion of the telephone body is rotated away from the first portion to an "open position", the antenna is extended out of the body. When the second portion is rotated back towards to first portion to a "closed position", the antenna is retracted into the body.

In another embodiment, the means for rotating the wheel comprises a second elongated slide track. The second slide track also has means disposed thereon for engaging a wheel that is affixed to at least a portion of the second slide track. In this design, the second slide track is disposed in an opposed relationship to the first slide track, such that the wheel is disposed between the two tracks. This design is particularly desirable in a "slide" style telephone. In this type of telephone, the second portion of the body is slid away from the first portion of the body. Since the second slide track is disposed within the second portion of the body, this sliding action imparts a rotational force to the wheel. The rotation of the wheel causes the first slide track to move linearly in a direction opposite to that of the second slide track. Thus, when the second portion of the body is moved away from the first portion to an "open position", the antenna is extended out of the body. Conversely, when the second portion is slid towards to the first portion, the antenna is retracted back into the body.

A guide tube may also be optionally provided. When utilized, the guide tube slidably supports at least a portion of the antenna, such that when the antenna is extended and retracted, the guide tube supports the antenna within the body.

The present invention utilizes few parts, all of which are readily and inexpensively available. Consumers demand compact, attractive, and durable portable radiotelephones. It is an object of the present invention to address those demands with an automatically extendable and retractable antenna that is operated by mechanical means.

BRIEF DESCRIPTION OF THE DRAWINGS

In the accompanying Figures, there are shown present preferred embodiments of the invention wherein like reference numerals are employed to designate like parts and wherein:

FIGS. 4(a) and (b) are perspective views of a "slide" style portable telephone in the closed and open positions respectively, in accordance with another embodiment of the present invention.

DETAILED DESCRIPTION OF THE INVENTION

Figures 1A, 1B:
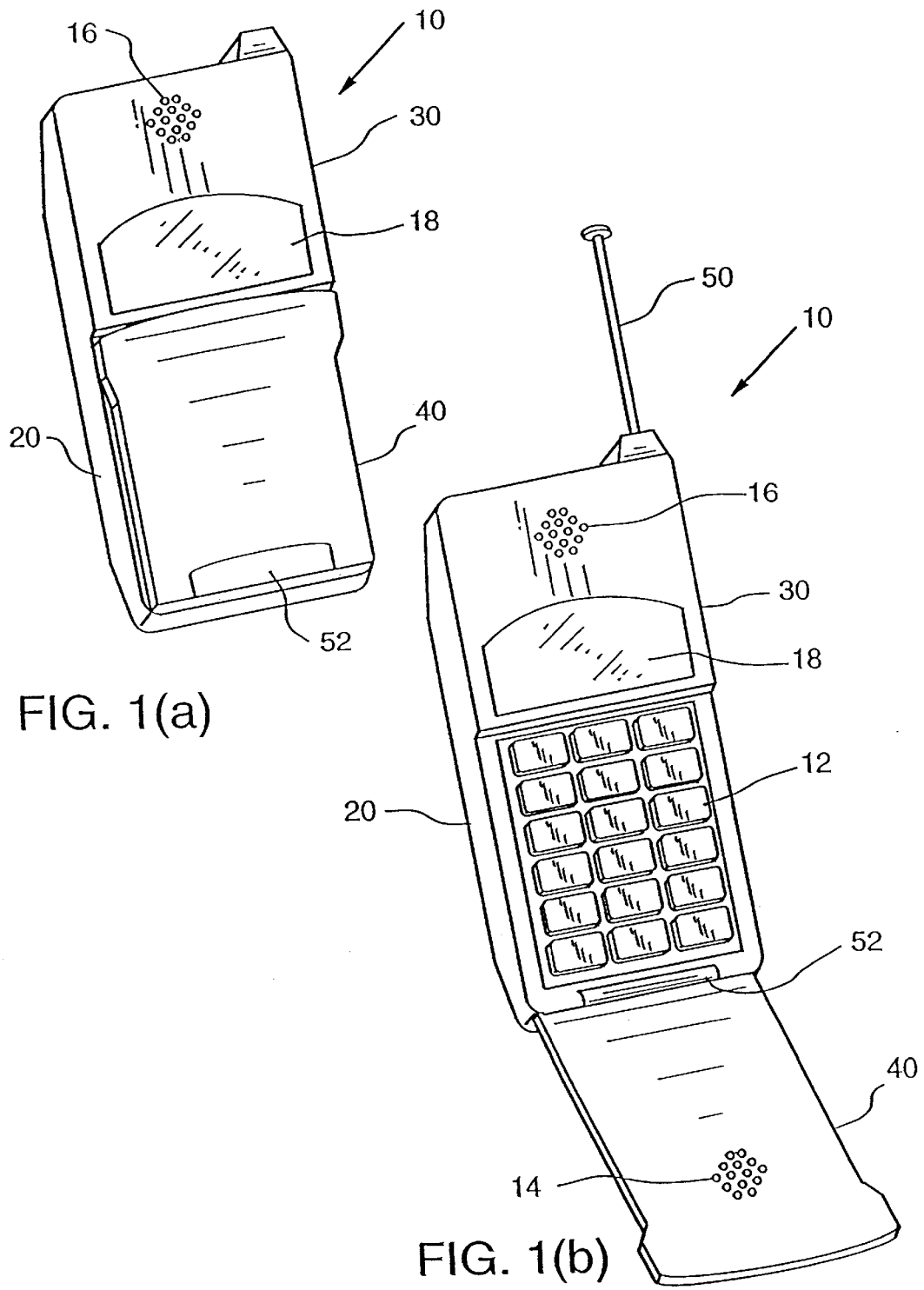
FIGS. 1(a) and (b) are perspective views of a "flip-type" portable telephone in the closed and open positions respectively, in accordance with one embodiment of the present invention.

Referring now to the drawings for the purpose of illustrating present preferred embodiments of the invention only and not for the purpose of limiting the same, FIGS. 1(a) and (b) depict one embodiment of a portable radiotelephone (or cellular telephone) 10 of the present invention. This style of telephone is generally known as a "flip-type" telephone. FIG. 1(a) illustrates the radiotelephone 10 in its closed, stand-by, position, while FIG. 1(b) illustrates the radiotelephone 10 in its open, operating, position.

As is readily apparent, the radiotelephone 10 has a body or housing 20 that consists of an upper, first portion 30 and a lower, second portion 40. Disposed on the first portion 30 may be a keypad 12, an earpiece 16, and a display 18. A mouthpiece 14 may be disposed on the second portion 40. These features are standard features that are present in prior art portable telephones. Thus, the construction and operation of such components are known in the art and will not be discussed in detail herein.

In this embodiment of the present invention, the radiotelephone 10 has a flip rod 52 that is disposed between the first portion 30 and the second portion 40 of the housing 20, is attached to the second portion 40 and pivotally connects the first portion 30 to the second portion 40. When the user rotates the second portion 40 from the closed position, as shown in FIG. 1(a), to the open position, as shown in FIG. 1(b), the flip rod 52 is rotated.

Figure 2:
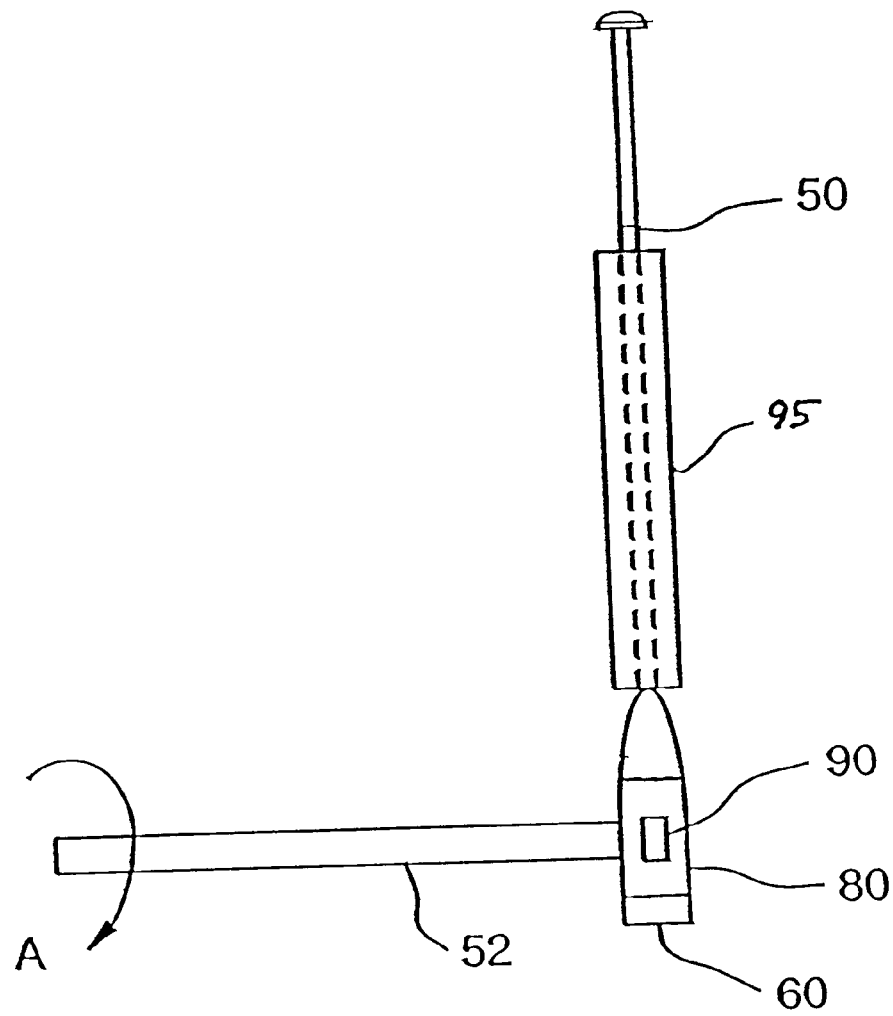
FIG. 2 is a front view of an auto-extending and auto-retracting antenna system for use in a "flip-type" portable telephone, in accordance with an embodiment of the present invention.
Figure 3A:
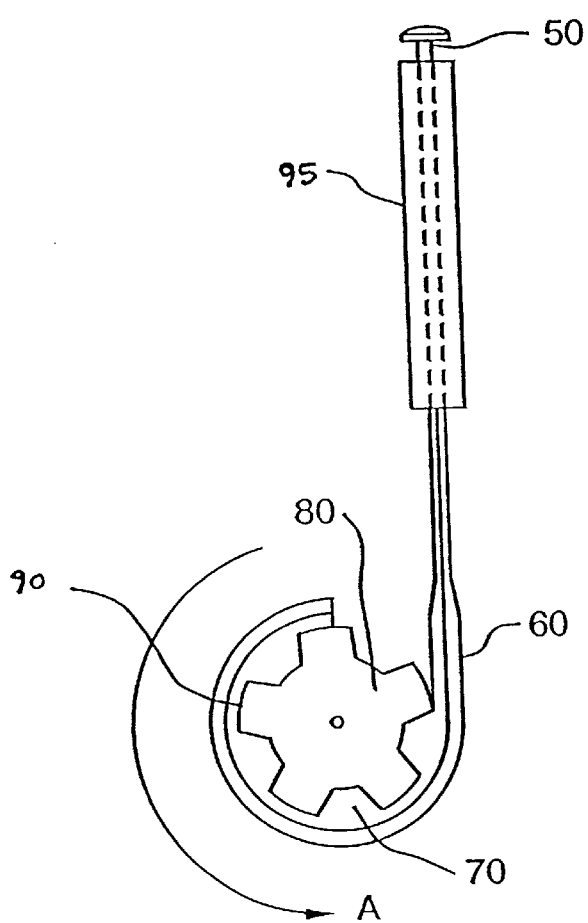
FIGS. 3(a) and (b) are side views of an auto-extending and auto-retracting antenna system for use in a "flip-type" portable telephone in the closed and open positions respectively, in accordance with an embodiment of the present invention.
Figure 3B:
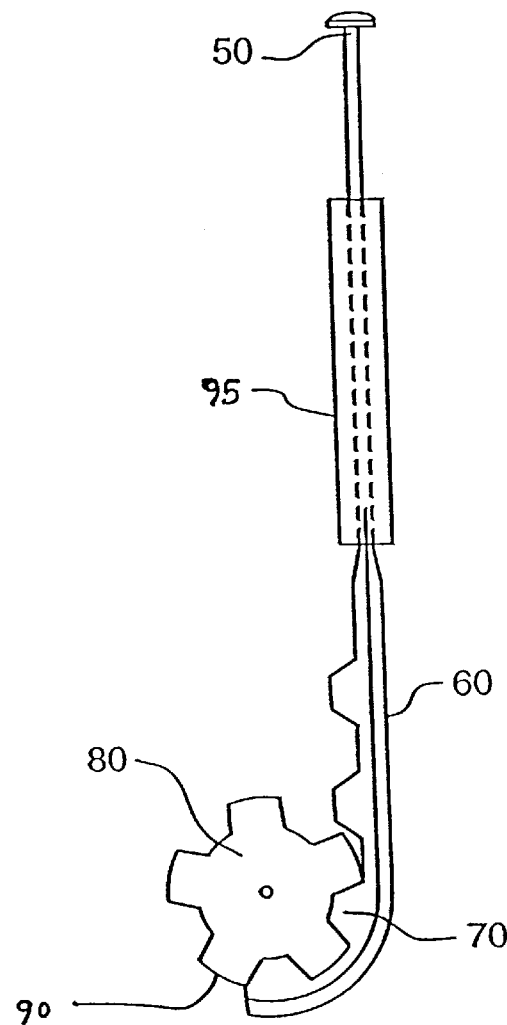

Referring now to FIGS. 2 and 3, there is depicted an embodiment of the auto-extending and auto-retracting antenna system of the present invention, for use in the "flip-type" telephone depicted in FIGS. 1(a) and (b). As can be seen in FIGS. 2, 3(a) and 3(b), this embodiment of the present invention includes an elongated "first" slide track 60 that has a plurality of first gear teeth 70 disposed therealong.

In one embodiment, the first slide track 60 is flexible and is manufactured from a plastic material. However, those skilled in the art will appreciate that the first slide track 60 may be fabricated from any non-conductive material that will not cause electrical interference. One end of the first slide track 60 is affixed to a conventional antenna by any suitable means such as, for example, glue, solder, rivets, clips, and/or snaps. The antenna 50 is preferably constructed of a metal wire encased in plastic, as is well known in the art. The slide track 60 is permanently affixed to a wheel or gear 80 with an adhesive, soldering, or the like.

As is seen in FIG. 2, the gear 80 is disposed at one end of the flip rod 52. In this embodiment, the gear 80 has a plurality of "second" gear teeth 90 that are adapted to intermesh with a plurality of "first" gear teeth 70 disposed on the first slide track 60. In one embodiment, the gear 80 is fabricated from a plastic material, and is provided with several second gear teeth 90. However, other suitable materials such as, for example, metal may be to form the gear, and, as will be apparent to those skilled in the art, the number of gear teeth may be varied. Also in this embodiment, the first slide track is provided with a corresponding number of first gear teeth 70 configured for intermeshing engagement with the second gear teeth 90 such that the antenna 50 is extended to a desired position when the body portion 40 is pivoted to an open position (FIG. 1(*b*)) and is retracted to a desired position when the body portion 40 is pivoted to a closed position (FIG. 1(*a*)) as will be discussed in further detail below.

Now referring to FIGS. 3(*a*) and (*b*), when the flip rod 52 is turned in the direction of arrow A, wherein the second portion 40 of the housing 20 is rotated away 20 from the first portion 30, the first slide track 60, to which an elongated antenna 50 is affixed, is likewise rotated, thereby forcing the antenna 50 to move linearly into the extended position. The movement of the antenna 50 may be guided in a desired axial direction by the provision of a guide tube 95, which may be constructed of a plastic material. Conversely, when the flip rod 52 is rotated in the opposite direction, by rotating the second portion 40 towards the first portion 30 to close the telephone, the first gear teeth 70 on the first slide track 60 engage with the second gear teeth on the gear 80, thereby retracting the antenna 50 into the guide tube 95 and into the retracted position shown in FIGS. 1(*a*) and 3(*a*).

Electrical interconnection of the antenna 50 with the internal electronics of the radiotelephone 10 may be provided by upper and lower contacts (not shown). The upper contact ensures electrical interconnection of the antenna 50 when it is in the extended position, while the lower contact maintains electrical interconnection of the antenna 50 when it is in the retracted position. This feature is well known in the art and is taught in, for example, U.S. Pat. No. 5,714,958, the relevant teachings of which are incorporated by reference herein.

Referring now to FIGS. 4(*a*) and (*b*) there is depicted another embodiment of a portable radiotelephone (or cellular telephone) 110 of the present invention. This style of telephone is generally known as a "slide" style telephone. FIG. 4(*a*) illustrates the radiotelephone 110 in its closed, stand-by, position, while FIG. 4(*b*) illustrates the radiotelephone 110 in its open, operating, position.

As is readily apparent, the radiotelephone 110 has a body or housing 120 that consists of an upper, first portion 130 and a lower, second portion 140. Disposed on the first portion 130 may be a keypad 112, an earpiece 116, and a display 118. A mouthpiece 114 may be disposed on the second portion 140. These are standard features that are present in prior art slide style telephones. Thus, the construction and operation of such components are known in the art and will not be discussed in great detail herein.

In this embodiment, the radiotelephone 110 has cooperatively engaging tracks 154 and 156 (not shown) that are cooperatively disposed on first portion 130 and the second portion 140 of the body 120, respectively. The tracks 154 and 156 permit the user to slide the second portion 140 from the closed position, as shown in FIG. 4(*a*), to the open position, as shown in FIG. 4(*b*). As is apparent, when the second portion 140 of the housing 120 is in the closed position, it covers the keypad 112 and the display 118. As can be seen in FIGS. 4(*b*) and 5(*b*), when the second portion 140 is slid to the open position, as shown in FIG. 4(*b*), an antenna 150 is extended out of the housing 20. This extension occurs automatically when the user slides the bottom portion 140 to the open position.

Referring now to FIGS. 5(*a*) and (*b*) there is depicted an embodiment of the auto-extending and auto-retracting antenna system of the present invention, for use in the "slide" style telephone depicted in FIGS. 4(*a*) and (*b*). As can be seen in those Figures, there is a first elongated slide track 160 (not visible in FIG. 4), preferably constructed of plastic, slidably disposed within the first portion 130 of the housing 120. However, first slide track 160 may be fabricated from a myriad of other suitable materials. First slide track 160 has a plurality of first gear teeth 170 formed thereon for intermeshing engagement with "second" gear teeth 190 of a wheel or gear 180 rotatably mounted within the first portion 130 of the housing 120. One end of the first slide track 160 is affixed to a conventional antenna 150 by any suitable means such as, for example, glue, rivets, solder, clips, and/or snaps.

Opposite the first slide track 160 is a second slide track 200 (not visible in FIG. 4) that is disposed within, and attached to, the second portion 140 of the housing 120. Like the first slide track 160, the second slide track 200 contains means for engaging the gear 180, shown in the form of a plurality of "third" gear teeth 210 in FIGS. 5(*a*) and 5(*b*).

As can be seen in FIGS. 5(*a*) and 5(*b*), the gear 180 is disposed between the first elongated slide track 160 and the second elongated slide track 200. Those of ordinary skill in the art will appreciate that the number of first gear teeth 170, second gear teeth 190, and third gear teeth 210 may be selected such that when the second portion 140 is slid to an open position as shown in FIG. 4(*b*), the antenna 150 is moved to a desired extended position and when the second portion 140 is slid to a closed position as shown in FIG. 4(*a*), the antenna 150 is moved to a desired retracted position.

Operation of the auto-extending and auto-retracting antenna is as follows. To open the telephone so as to make or receive a call, the user slides the second portion 140 of the housing 120 away from the first portion 130 (represented by arrow "B" in FIG. 4(*a*)). This movement exposes the keypad 112 and the display 118. Further, as the second portion 140 is slid away from the first portion 130, the second slide track 200, which is disposed within, and attached to, the second portion 140, moves in the "B" direction. See FIG. 5(*a*). This movement imparts a counterclockwise (represented by arrow "C" in FIG. 5(*a*)) rotation of gear 180 because the third gear teeth 210 of the second slide track 200 are engaged with the second gear teeth 190 of the gear 180. The counterclockwise rotation of gear 180 causes the first slide track 160 that is affixed to antenna 150 to move in a direction opposite to the movement of the second slide track 200

Figures 5A, 5B:
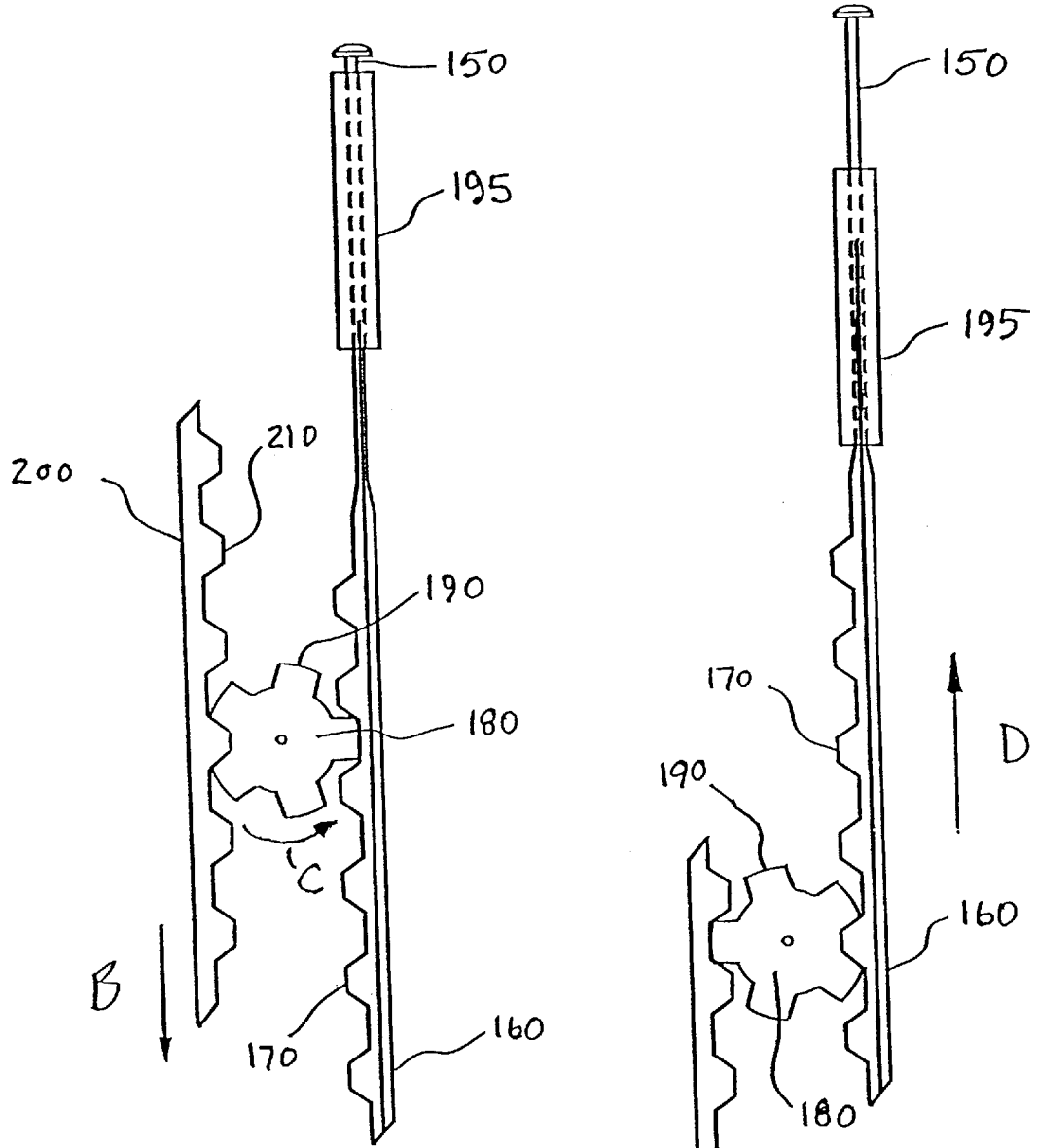
FIGS. 5(a) and (b) are side views of an auto-extending and auto-retracting antenna system for use in a "slide" style portable telephone, in accordance with an embodiment of the present invention.

(represented by arrow "D" in FIG. 5(b)). As the first slide track 160 moves, the antenna 150 is moved through the elongated guide tube 195 and the antenna 150 is moved to a desired extended position. When the user has completed the call, sliding the second portion 140 of housing 120 towards the first portion 130 (direction "D") closes the telephone. This movement causes the antenna 150 to be lowered into the guide bar 120 as the slide tracks 160 and 200 and the gear 180 move in directions opposite to those described above.

In this embodiment, as in the previous embodiment, the gear 180 and guide tube 195 may be constructed of a plastic material. However, those skilled in the art will appreciate that these components may be fabricated from any non-conductive material that will not cause electrical interference. The antenna 150 may be of conventional construction that includes a metal wire encased in plastic. The slide track 160 may also be constructed of plastic or any other non-conductive material. Also, in this embodiment electrical interconnection of the antenna 150 with the internal electronics of the radiotelephone 110 may again be provided by upper and lower contacts in a conventional manner (not shown). The upper contact ensures electrical interconnection of the antenna 150 when it is in the raised position, while the lower contact maintains electrical interconnection of the antenna 150 when it is in the lowered position.

Thus, from the foregoing discussion, it is apparent that the subject invention addresses many problems associated with portable telephone antennas. In particular, the subject invention provides a selectively extendable and retractable antenna for a portable telephone that is stored inside of the telephone housing when not in use and can be selectively extended when a portion of the telephone is manipulated into a position facilitating its use. The antenna is then automatically retracted back into the housing when the portion is returned to a "non-use" position. Such automatic extension and retraction eliminates the chance of damage to the antenna resulting from its manual manipulation. The subject invention does not require a source of power that can drain its battery. Those of ordinary skill in the art will, of course, appreciate that the various changes in the details, materials and arrangement of parts which have been described and illustrated in order to explain the nature of the invention may be made by the skilled artisan within the principle and scope of the invention as expressed in the appended claims.

What is claimed is:

1. An antenna system for a telephone, the antenna system comprising:

an elongated first slide track slidably received within the telephone and non-movably affixed to an elongated antenna, the first slide track having first engaging means disposed along at least a portion of the first slide track;

a gear rotatably supported within the telephone and having means for interlocking with the first engaging means; and means for rotating the gear by rotational movement of at least a portion of the telephone, wherein said means for rotating comprises an elongated guide rod affixed to said gear.

2. A portable radio telephone comprising:

a housing having a first portion and a second portion, the second portion being pivotally connected to the first portion by an elongated guide rod disposed between said first portion and said second portion;

an elongated first slide track disposed within said first portion, said elongated first slide track being non-movably affixed to an antenna and having first engaging means disposed along at least a portion of said elongated first slide track; and a gear affixed to said guide rod, said gear having means for interlocking engagement with said first engaging means.

3. The portable radiotelephone of claim 2 wherein said first engaging means comprises a plurality of first teeth and said interlocking means comprises a plurality of second teeth.

4. The portable radiotelephone of claim 2 wherein said antenna comprises a metal wire encased in plastic.

5. The portable radiotelephone of claim 2 further comprising an elongated guide tube mounted within said first portion and slidably supporting said slide track therein.

6. An antenna for a telephone having a telephone housing including a second housing portion pivotally attached to a first housing portion and being selectively pivotable between an open position and a closed position, the antenna comprising:

a flexible slide track having a plurality of first gear teeth thereon and being slidably supported within the first housing portion;

an antenna having a portion thereof received within the first housing portion and non-movably attached to said flexible slide track; and a gear rotatably supported within the first housing portion and in intermeshing engagement with said first gear teeth, said gear constructed to rotate in a first direction when the second portion is pivoted to the open position and said gear constructed to rotate in a second direction opposite to the first direction when the second portion is pivoted to the closed position.

7. The antenna of claim 6 wherein the first and second housing portions are pivotally coupled together by a flip rod and wherein said gear is attached to said flip rod.

* * * * *